T. A. SILVERWOOD.
VEHICLE WHEEL.
APPLICATION FILED APR. 22, 1907.
904,023.
Patented Nov. 17, 1908.
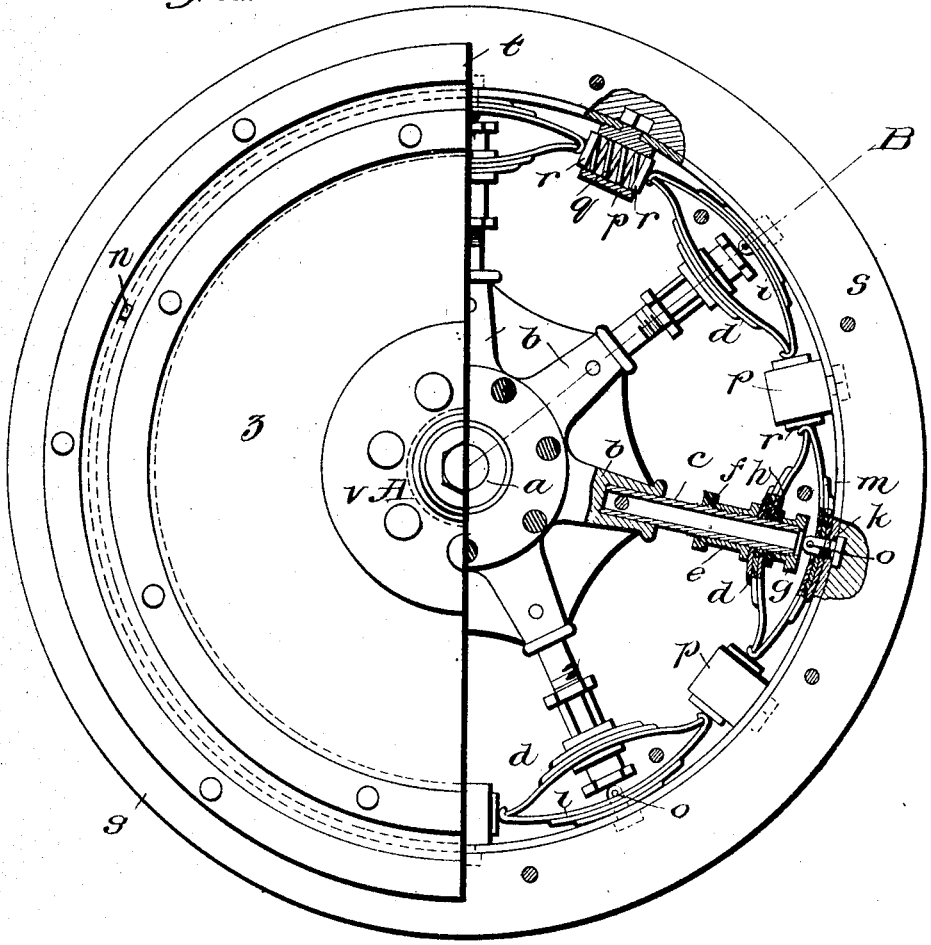
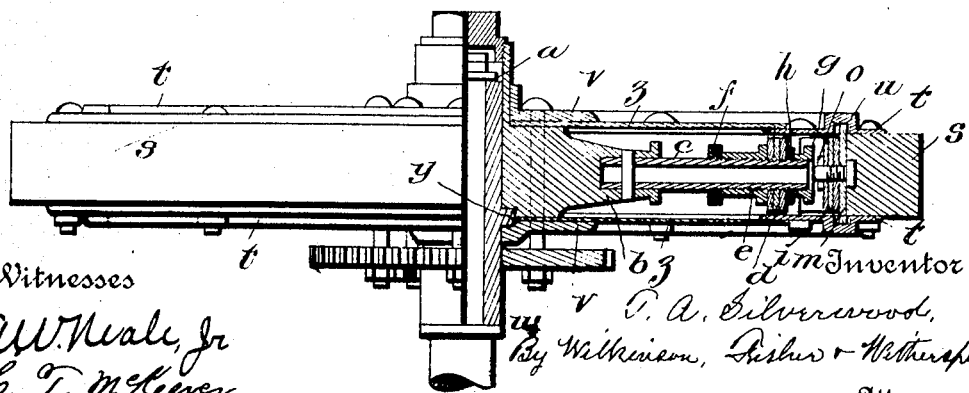

UNITED STATES PATENT OFFICE.

THOMAS ALFRED SILVERWOOD, OF LONDON, ENGLAND.

VEHICLE-WHEEL.

No. 904,023.     Specification of Letters Patent.     Patented Nov. 17, 1908.

Application filed April 22, 1907. Serial No. 369,647.

*To all whom it may concern:*

Be it known that I, THOMAS ALFRED SILVERWOOD, a subject of the King of England, residing at 32 Nicholas Lane, Lombard street, in the city of London, England, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels, and the object of my invention is to provide a spring cushion frame wheel adjustable to any desired tension, the frame expands automatically with the adjustment of the springs.

With this object in view, my invention consists of the construction and combinations of parts as hereinafter described and claimed.

In the accompanying drawings Figure 1 shows a front elevation of the wheel with the top part of the disk removed, shown partly in section; Fig. 2 shows a side elevation of the wheel the top half in section through line A, B, Fig. 1.

$a$ shows the hub of the wheel, provided with series of sockets $b$.

$c$ shows tubes forming spokes or arms of the wheel. These tubes or spokes are provided with a fine thread. Each of the spokes passes through a hole in the inner half $d$ of a bow spring.

$e$ shows a socket screwed on to the spoke $c$, kept in position by means of a lock nut $f$. $g$ shows another socket provided with a nut $h$.

$i$ is the outer half of the bow spring, the ends of which are bent over to embrace the ends of the inner half $d$.

$k$ is a stud screwed through the expanding frame or rim $m$, which rim or frame is cut through at $n$ to allow for expansion (caused by the tightening of the bow springs) and at the same time forming a gripping action on the tire. Through the end of the stud $k$ is passed a pin $o$, such pin passing inside the outer half $i$ of the bow spring. The head of the stud $k$ fits into a corresponding recess in the tire hereinafter described.

$p$ is a bearing piece bolted to the frame or rim $m$. Into this bearing piece is placed a helical buffer spring $q$ in compression, and at each end of this bearing piece is placed a disk $r$ forming a spring buffer against which the turned over ends of the bow springs press. $s$ shows the tire which is of any ordinary construction.

On each side of the tire is bolted a ring $t$ which is grooved at $u$, see Fig. 2, to receive the expanding rim or frame $m$, such groove being made of sufficient size to allow for the expansion of the rim or frame $m$.

$v$ shows a disk bolted on each side of the hub $a$.

$w$ shows an axle box provided with a boss or collar $y$, which takes into a suitable groove, half of which is formed in the body of the hub $a$ and the other half in one of the plates $v$.

$z$ shows a thin metal disk bolted to the hub so as to protect the bow springs and other mechanism.

The tension of the bow springs may be adjusted by means of the adjustable sockets and lock nuts $e$, $f$, $g$ and $h$, that is, in order to put a greater tension on the bow spring the socket $g$ and nut $h$ will be unscrewed to any desired extent, and the socket $e$ and nut $f$ screwed up to a corresponding extent. If it is desired to limit the action of the bow spring, or in the case of the bow spring breaking, the socket may be unscrewed so as to come nearer to the outer part of the portion $i$ of the bow spring. It will be seen that as pressure is brought to bear on the bow spring the ends thereof will be forced against the disk $r$ of the spring buffers, and thus prevent any sudden jerk and will distribute the pressure of the springs round the whole wheel.

I claim—

A vehicle wheel comprising an expanding frame, a hub and spokes, one end of each spoke being connected to the hub and the other end being free to move in the frame, springs, one of which is attached to each of said spokes and spring buffers connecting with said springs, substantially as described.

In testimony whereof, I affix my signature, in presence of two witnesses.

THOMAS ALFRED SILVERWOOD.

Witnesses:
A. E. VIDAL,
H. ROWLEY.